(12) United States Patent
Alshawabkeh et al.

(10) Patent No.: US 11,392,442 B1
(45) Date of Patent: Jul. 19, 2022

(54) STORAGE ARRAY ERROR MITIGATION (71) Applicant: EMC IP Holding Company LLC, Hopkinton, MA (US)

(72) Inventors: Malak Alshawabkeh, Franklin, MA (US); Sunil Gumaste, Karnataka (IN); Abhilash Sanap, Maharashtra (IN); Ravish Sachdeva, Jammu (IN); Pankaj Soni, Sikar (IN); Rong Yu, West Roxbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/234,293

(22) Filed: Apr. 19, 2021

(51) Int. Cl.
*G06F 11/07* (2006.01)
(52) U.S. Cl.
CPC ...... *G06F 11/0772* (2013.01); *G06F 11/0721* (2013.01)
(58) Field of Classification Search
CPC ............. G06F 11/0721; G06F 11/0772; G06F 11/076; G06F 11/0793; G06F 11/1407

USPC .............................................. 714/6.2, 10, 15
See application file for complete search history.

(56) References Cited

U.S. PATENT DOCUMENTS

| | | | | |
|---|---|---|---|---|
| 6,662,204 B2 * | 12/2003 | Watakabe | ............. | G06F 9/4843 712/229 |
| 7,739,689 B1 * | 6/2010 | Spertus | ................. | G06F 11/328 719/317 |
| 8,365,014 B2 * | 1/2013 | Lynn | ................... | G06F 11/1402 714/15 |

* cited by examiner

*Primary Examiner* — Joseph R Kudirka
(74) *Attorney, Agent, or Firm* — Krishnendu Gupta; Nikhil Patel (57) ABSTRACT

An aspect of the present disclosure relates to one or more techniques to identify and resolve storage array errors. In embodiments, an error notification related to a computing device can be received. One or more threads related to the error notification can further be identified. Additionally, an error resolution technique can be performed based on each identified thread.

16 Claims, 5 Drawing Sheets

STORAGE ARRAY ERROR MITIGATION

BACKGROUND

A storage array is a data storage system that includes multiple storage drives (e.g., hard disk drives (HDDs) or solid-state drives (SSDs)). Storage array system allows the separation of data storage from computing devices. The separation of data storage from computing devices enables multiple users to collaborate and share information in a scalable manner. A storage array can include a storage management system that controls data storage and access. The storage management system can include an operating system that manages a storage array's memory, processes, software, hardware, and communications.

SUMMARY

An aspect of the present disclosure relates to one or more techniques to identify and resolve storage array errors. In embodiments, an error notification related to a computing device can be received. One or more threads related to the error notification can further be identified. Additionally, an error resolution technique can be performed based on each identified thread.

In embodiments, processing events of each thread can be monitored.

In embodiments, an event tracker can be inserted in each thread's processing path.

In embodiments, each event tracker can be incremented in response to a processing initialization of each event tracker's related thread.

In embodiments, periodic snapshots of one or more threads can be captured using each thread's event tracker.

In embodiments, a heatmap of one or more threads for each period can be generated using the snapshots.

In embodiments, heatmap differences between at least one location on a current heatmap and at least one corresponding location on one or more previous heatmaps can be identified.

In embodiments, each heatmap's location can relate to a subject thread of one or more threads.

In embodiments, each location on the current heatmap having a heatmap difference that exceeds a threshold can be identified.

In embodiments, at least one of the threads related to each identified location can be selected. The error resolution technique can be performed based on the selected at least one thread.

BRIEF DESCRIPTION OF THE DRAWINGS

The preceding and other objects, features, and advantages will be apparent from the following more particular description of the embodiments, as illustrated in the accompanying drawings. Like reference characters refer to the same parts throughout the different views. The drawings are not necessarily to scale, emphasis instead being placed upon illustrating the embodiments' principles.

DETAILED DESCRIPTION

A storage array can include a storage management system that controls data storage and access. The storage management system can include an operating system that manages a storage array's memory, processes, software, hardware, and communications. Further, a remote system can provide the array's management system with an update to the array's operating system. The operating system update can include service packs, version upgrades, security updates, drivers, and the like. Occasionally, operating system updates can cause unforeseen errors. These errors can be tough to diagnose. As such, these types of errors can require significant resources (e.g., staffing and cost).

Embodiments of the present disclosure relate to one or more techniques to identify and resolve errors resulting from, e.g., an operating system update.

Figure 1:
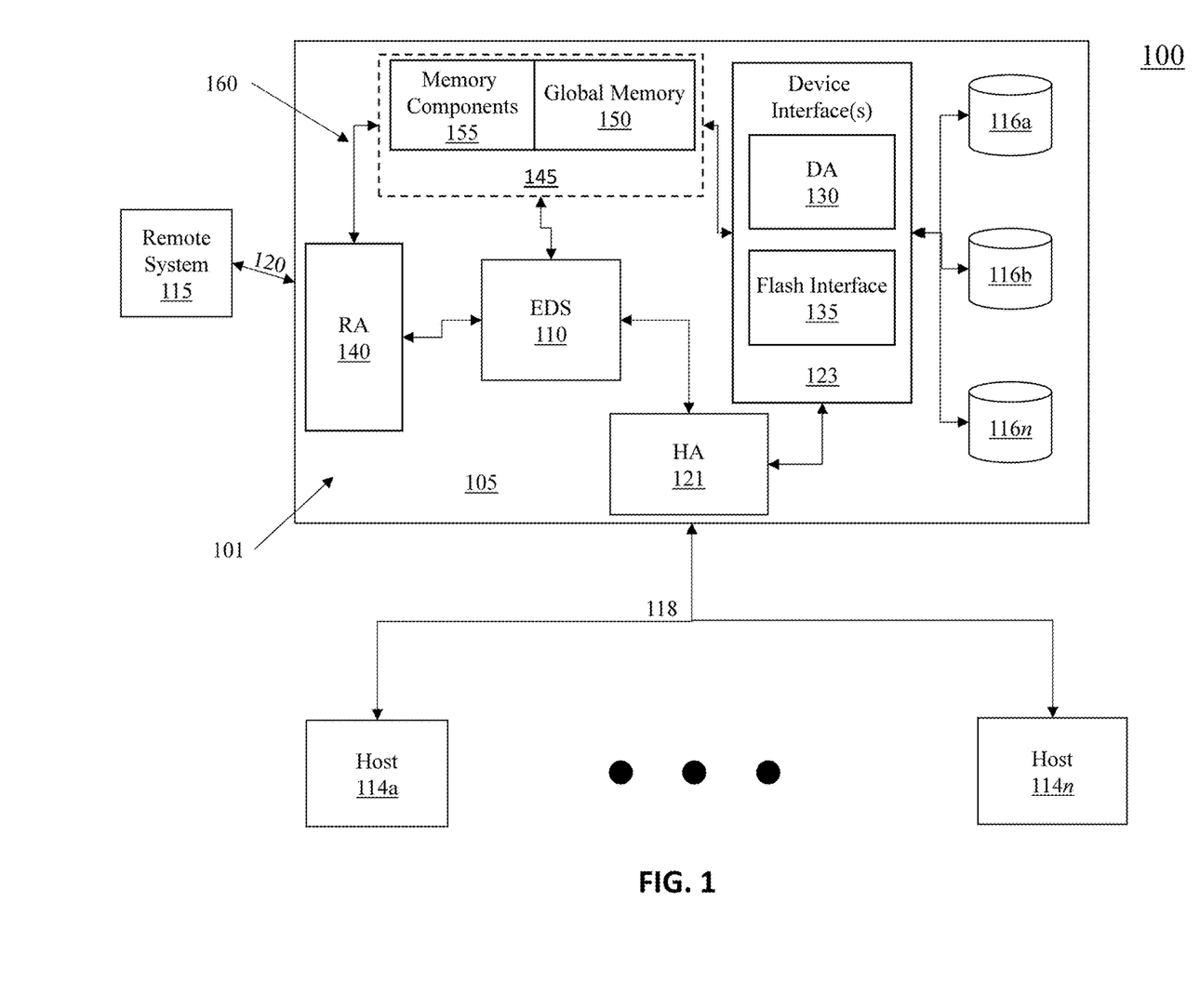
FIG. 1 is a block diagram of a storage array in accordance with embodiments of the present disclosure.

Referring to FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, and/or communication modules. For example, the array's global memory 150 can use the communication channels 160 to transfer data and/or send other communications between the array's components 101.

In embodiments, the array 105 and one or more devices can form a network. For example, a first communication network 118 can communicatively couple the array 105 to one or more host systems 114*a-n*. Likewise, a second communication network 120 can communicatively couple the array 105 to a remote system 115. The first and second networks 118, 120 can interconnect devices to form a network (networked devices). The network can be a wide area network (WAN) (e.g., Internet), local area network (LAN), intranet, Storage Area Network (SAN)), and the like.

In further embodiments, the array 105 and other networked devices (e.g., the hosts 114*a-n* and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 115*a-n*, and the like can connect to the first and/or second networks 118,120 via a wired/wireless network connection interface, bus, data link, and the like. Further, the first and second networks 118, 120 can also include communication nodes that enable the networked devices to establish communication sessions. For example, communication nodes can include switching equipment, phone lines, repeaters, multiplexers, satellites, and the like.

In embodiments, one or more of the array's components 101 can process input/output (IO) workloads. An IO workload can include one or more IO requests (e.g., operations) originating from one or more of the hosts 114*a-n*. The hosts 114*a-n* and the array 105 can be physically co-located or located remotely from one another. In embodiments, an IO request can include a read/write request. For example, an application executing on one of the hosts 114a-n can perform a read or write operation resulting in one or more data requests to the array 105. The IO workload can correspond to IO requests received by the array 105 over a time interval.

In embodiments, the array 105 and remote system 115 can include any one of a variety of proprietary or commercially available single or multi-processor systems (e.g., an Intel-based processor and the like). Likewise, the array's components 101 (e.g., host adapter (HAI 121, RA 140, device interface 123, and the like) can include physical/virtual computing resources (e.g., a processor and memory) or require access to the array's resources. The memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to one or more of the array's components 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile and/or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM and the like. Like the array's storage devices 116a-n, the array's memory 145 can have different storage performance capabilities.

In embodiments, a service level agreement (SLA) can define at least one Service Level Objective (SLO) the hosts 114a-n expect the array 105 to achieve. For example, the hosts 115a-n can include host-operated applications. The host-operated applications can generate data for the array 105 to store and/or read data the array 105 stores. The hosts 114a-n can assign different levels of business importance to data types they generate or read. As such, each SLO can define a service level (SL) for each data type the hosts 114a-n write to and/or read from the array 105. Further, each SL can define the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114a-n with logical representations of the array's physical storage devices 116a-n and memory 145 rather than giving their respective physical address spaces. For example, the EDS 110 can establish at least one logical unit number (LUN) representing a slice or portion of a configured set of disks (e.g., storage devices 116a-n). The array 105 can present one or more LUNs to the hosts 114a-n. For example, each LUN can relate to at least one physical address space of storage. Further, the array 105 can mount (e.g., group) one or more LUNs to define at least one logical storage device (e.g., logical volume (LV)).

In further embodiments, the HA 121 can receive an IO request that identifies one or more of the array's storage tracks. Accordingly, the HA 121 can parse that information from the IO request to route the request's related data to its target storage track. In other examples, the array 105 may not have previously associated a storage track to the IO request's related data. The array's DA 130 can assign at least one storage track to service the IO request's related data in such circumstances. In embodiments, the DA 130 can assign each storage track with a unique track identifier (TID). Accordingly, each TID can correspond to one or more physical storage address spaces of the array's storage devices 116a-n and/or global memory 145. The HA 121 can store a searchable data structure that identifies the relationships between each LUN, LV, TID, and/or physical address space. For example, a LUN can correspond to a portion of a storage track, while an LV can correspond to one or more LUNs and a TID corresponds to an entire storage track.

In embodiments, the array's RA 140 can manage communications between the array 105 and an external storage system (e.g., remote system 115) over, e.g., a second communication medium 120 using a communications protocol. In embodiments, the first medium 118 and/or second medium 120 can be an Explicit Congestion Notification (ECN) Enabled Ethernet network.

In embodiments, the array's EDS 110 can further perform one or more self-optimizing techniques (e.g., one or more machine learning techniques) to deliver performance, availability, and data integrity services for the array 105 and its components 101. For example, the EDS 110 can perform one or more techniques that identify and resolve errors resulting from, e.g., an operating system update, as discussed in greater detail herein.

Figure 2:
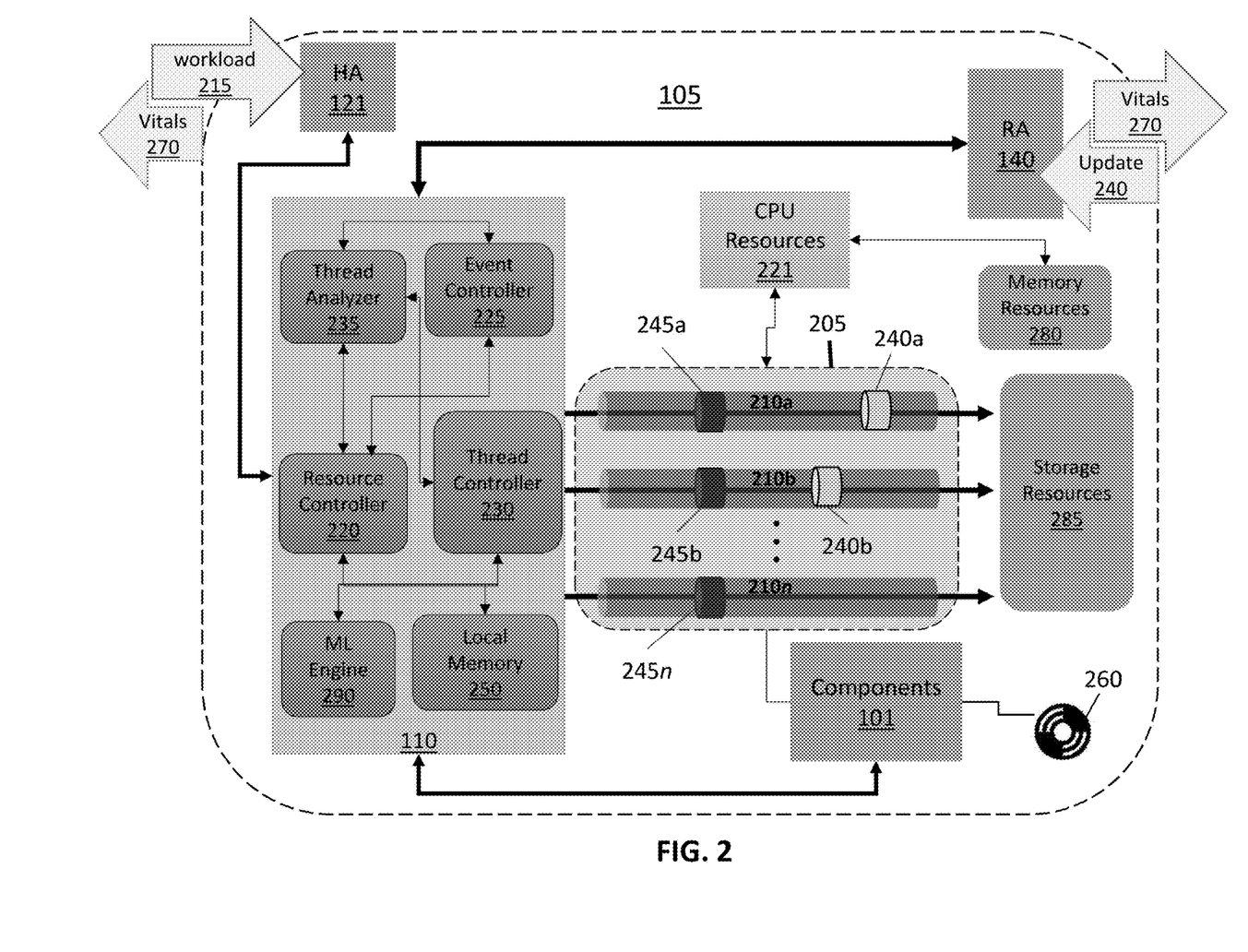
FIG. 2 is a block diagram of an EDS processor in accordance with embodiments of the present disclosure.

Regarding FIG. 2, the array's HA 121 can receive an IO workload 215 from at least one of the hosts 114a-n. The IO workload 215 can include one or more IO requests having a read/write operation. In embodiments, the IO's request can include data for the array 105 to store to or read from its storage resources (e.g., memory 145 and/or devices 116a-n of FIG. 1). For example, each IO can identify the storage resources using a virtual identifier (e.g., LUN) representing a portion (e.g., slice) of the array's memory 145 and/or devices 116a-n. In embodiments, the array's EDS 110 can receive one or more of the workload's IO requests from the HA 121. As described in greater detail below, the EDS 110 manages the processing of each IO request.

In embodiments, EDS 110 can include an event controller 225 that dynamically monitors the array's components 101. For example, the controller 225 can maintain an activity log of events for each of the array's components 101. The events can include real-time (i.e., current) and historical activity data. For example, the array 105 can include daemons 260 that communicatively couple to the array's components 110, e.g., via a Fibre channel 160 of FIG. 1. The daemons 260 can record its connected component's events in their respective activity logs. Each record can include information defining each recorded event's characteristics, including a component identifier, component type, event time, event duration, performance metrics, and telemetry data, amongst other event-related metadata.

In embodiments, controller 225 can generate one or more array activity snapshots by periodically retrieving each daemon's activity log. The controller 225 can store the snapshots and activity logs in the Alternatively, the controller 225 can randomly retrieve the snapshots. In other embodiments, the daemons 260 can randomly or periodically issue activity log reports to the event controller 225. For example, the controller 225 can generate a daemon reporting schedule that defines the duration, start time, and/or end time of each daemon's event collection period.

Upon retrieving or receiving each daemon's activity log, the controller 225 can generate an array activity snapshot from an aggregation of recorded events from one or more activity logs. Further, the controller 225 can parse the snapshot to identify whether any recorded events relate to an error event. For example, the event controller 225 can parse the snapshot's event records to determine if any event record's activity type corresponds to an error. The event controller 225 can issue an error alert in a vitals signal 270 to the hosts 114a-n via the HA 121. Additionally, the controller can issue the vitals signal 270 to the remote system 115 via RA 140.

Occasionally, an error can arise after an update of the array's operating system (OS). For example, the array 105 can receive an OS update 240 from the remote system 115. The update 240 may only include instructions for updating a set of the array's elements. For example, the OS update 240 can include service packs, version upgrades, security, driver updates, and the like. Occasionally, operating system updates like update 240 can cause unforeseen errors. These errors can be tough to diagnose. As such, these types of errors can require significant resources (e.g., staffing and cost). Embodiments of the present disclosure relate to one or more techniques to identify and resolve errors resulting from, e.g., an operating system update.

In embodiments, the EDS 110 can include a resource controller 220 that can allocate one or more of the array's CPU resources 221 to process each of the workload's IO requests 215 received by the HA 121. The CPU resources 221 can include one or more CPU cycles of at least one of the array's processors. Additionally, the resource controller can allocate one or more portions of the array's memory resources 280 (e.g., memory components 155 of FIG. 1). For example, the resource controller 220 can allocate the CPU and memory resources 221, 280 based on each request's IO characteristics. For instance, the resource controller 220 can parse the characteristics from each request's metadata. The IO characteristics can correspond to each request's IO's type, service level, read/write track identifier (TID), performance metrics, telemetry data, relationship to an IO sequence, and the like. Based on each request's IO characteristics, the resource controller 220 can determine the number of resources required to fulfill each request's related service level requirement.

In embodiments, the EDS processor's thread controller 230 can establish threads 205, including one or more code paths 210a-n. The thread controller 230 can establish each of the code paths 210a-n to process specific IO requests (i.e., requests having distinct IO characteristics). For example, the threads 205 can define one or more policies and/or instructions for traversing each of the code paths 210a-n.

Further, the thread controller 230 can insert a thread event tracker (e.g., one of the trackers 245a-n) in each of the code paths 210a-n. Each of the event trackers 245a-n can record their respective code paths' thread statistics (stats). The stats can be multi-dimensional time-series stats corresponding to one or more of each path's characteristics. The characteristics can correspond to one or more vital signs (e.g., connectivity and performance) of the array 105 and the threads 205. Additionally, the event trackers 245a-n can include a counter that increments each instance their respective code paths 210a-n initializes an IO request processing. The thread controller 230 can synchronize each tracker's counter with the daemons' reporting schedule. For example, the thread controller 230 can reset each tracker's counter to zero (0) at the start or end of the daemons' event collection period per their reporting schedules. The thread controller 230 can aggregate each tracker's recorded stats and counter data into a vital signs snapshot. The controller 230 can store each vital signs snapshot one of the array's storage resources 285 (e.g., local memory 250, memory 145, and devices 116a-n) and/or send the report to the remote system 115. The thread controller 230 can format the vital signs report according to a data schema having a configuration that enables efficient searching and analysis of multi-dimensional time-series data, e.g., a star data schema.

As described herein, the array 105 can receive an OS update 240. The update 240 can include code path updates 240a-b for respective code paths 210a-b. Occasionally, one or more of the code path updates 240a-b can result in at least one error. The error can cause the array's performance to degrade and even interrupt its ability to provide storage services. Accordingly, the EDS 110 can include a thread analyzer 235 that can identify which of the code path updates 240a-b is likely a cause of the error, as described in greater detail in the following paragraphs.

In embodiments, the thread analyzer 235 can analyze each vital signs snapshot and generate a heatmap (e.g., heatmap 300 of FIG. 3) the defines each code path's activity levels per snapshot period. Further, the analyzer 235 can analyze one or more historical and current vital signs snapshots to identify each code path's activity (e.g., IO processing) change rates. For example, the thread analyzer 235 can determine each of the code paths' activity levels from their corresponding event tracker's counter value. Using a machine learning (ML) engine 290, the analyzer 235 can further identify patterns in each code path's corresponding activity change rates. Additionally, the ML engine 290 can also discover error patterns corresponding to reported error events.

Further, the ML engine 290 can correlate each path's change-rate patterns with the error patterns. Based on the correlation, the ML engine 290 can identify any potential relationships between each of the code paths 210a-n, path updates 240a-b, event tracker counter values, and each identified error. Thus, the ML engine 290 can determine that each code path identified by the correlation may be a potential root cause. For example, the thread analyzer 235 can predict each of the correlation's identified code paths 210a-b error relationship based on their respective involvement with the OS update 240. For instance, the thread analyzer 235 can place a greater weight on each code path directly affected (e.g., updated) by the OS update 240. Additionally, the ML engine 290 can discover patterns between each of the correlation's identified code paths with their involvement with previously resolved efforts having similar characteristics as one of the current errors. As such, the thread analyzer 235 can further place additional weight on the code paths 210a-b with a relatively high error resolution involvement level.

In embodiments, the event controller 225 can send an error resolution report defining each code path's predicted relationship with an existing error to the remote system 115. Further, the event controller 225 can perform one or more error mitigation operations. For example, the event controller 225 can determine if at least one of the code path's error relationship prediction is greater than a relationship threshold. For each of the code path's error relationship prediction satisfying the threshold condition, the event controller 225 can identify a corresponding error mitigation policy stored, e.g., in the local memory 250, to resolve the error dynamically. Specifically, the local memory 250 can store an error policy data structure that associates at least one error resolution policy to an error type, each of the code paths 210a-n, and/or possible combinations of the code paths 210a-n. Each policy can include instructions for resolving a reported error.

Figure 3:
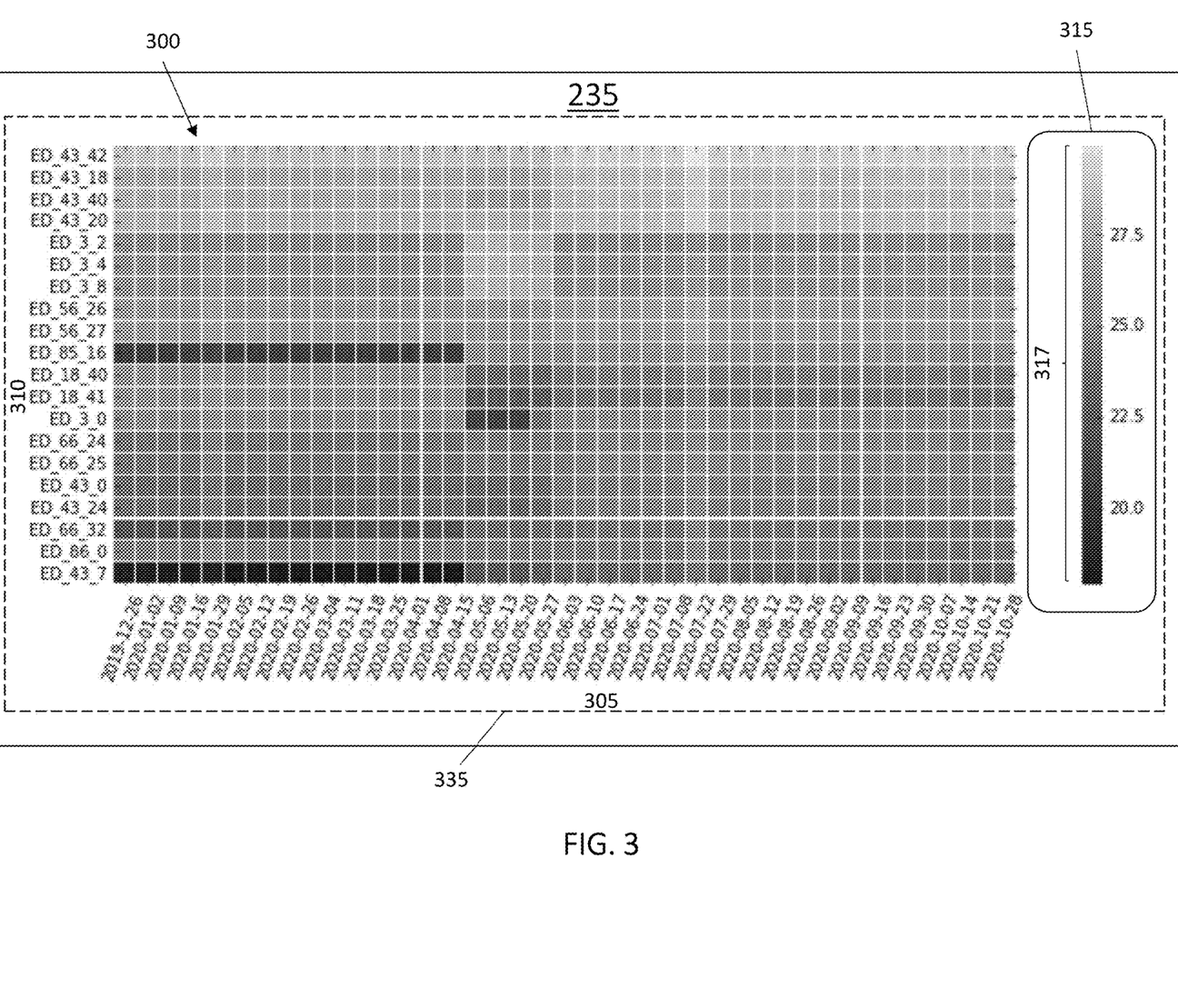
FIG. 3 is a heatmap chart in accordance with embodiments of the present disclosure.

Regarding FIG. 3, the thread analyzer 235 can include a snapshot processor 335 that generates a snapshot heatmap 300. The snapshot heatmap 300 can define the activity levels of each of the code paths 210a-n over a set of each code path's previously recorded activity level snapshots. In embodiments, the snapshot processor 335 can select the set's number of previously recorded snapshots that can collectively yield statistically relevant analytical results. For example, the snapshot processor 335 can determine a historical average total size of OS update-related error occurrences. Based on the historical OS updated-related error average total size, the snapshot processor 335 can determine the number of the code paths' previously recorded snapshots for the heatmap 300. Further, the snapshot processor 335 can select a set of the code paths 210a-n for the heatmap 300 based on their direct and/or indirect relationships with the OS update 240, anticipated OS update, and/or one or more recently reported errors.

In embodiments, the snapshot processor 335 can map each code path's event trackers 245a-n to the set of code paths' snapshots 305. For instance, the heatmap 300 can identify each of the event trackers 245a-n with their corresponding unique event tracker IDs 310. Further, the heatmap 300 can define each of the code path's snapshots 305 using timestamp data defining each snapshot's collection date, time, and/or period. Additionally, the snapshot processor 335 can include a heatmap engine 315 that defines a heat intensity index 315. The heat intensity index 315 can define instructions for visually representing the code paths' relative activity levels. For instance, the heatmap engine 315 can identify an activity level range for the set of code paths 210a-n represented by the heatmap 300 by identifying the event trackers 245a-n with the highest and lowest counter values. The heatmap engine can use the activity level range to generate the heatmap intensity index 315.

Figure 4:
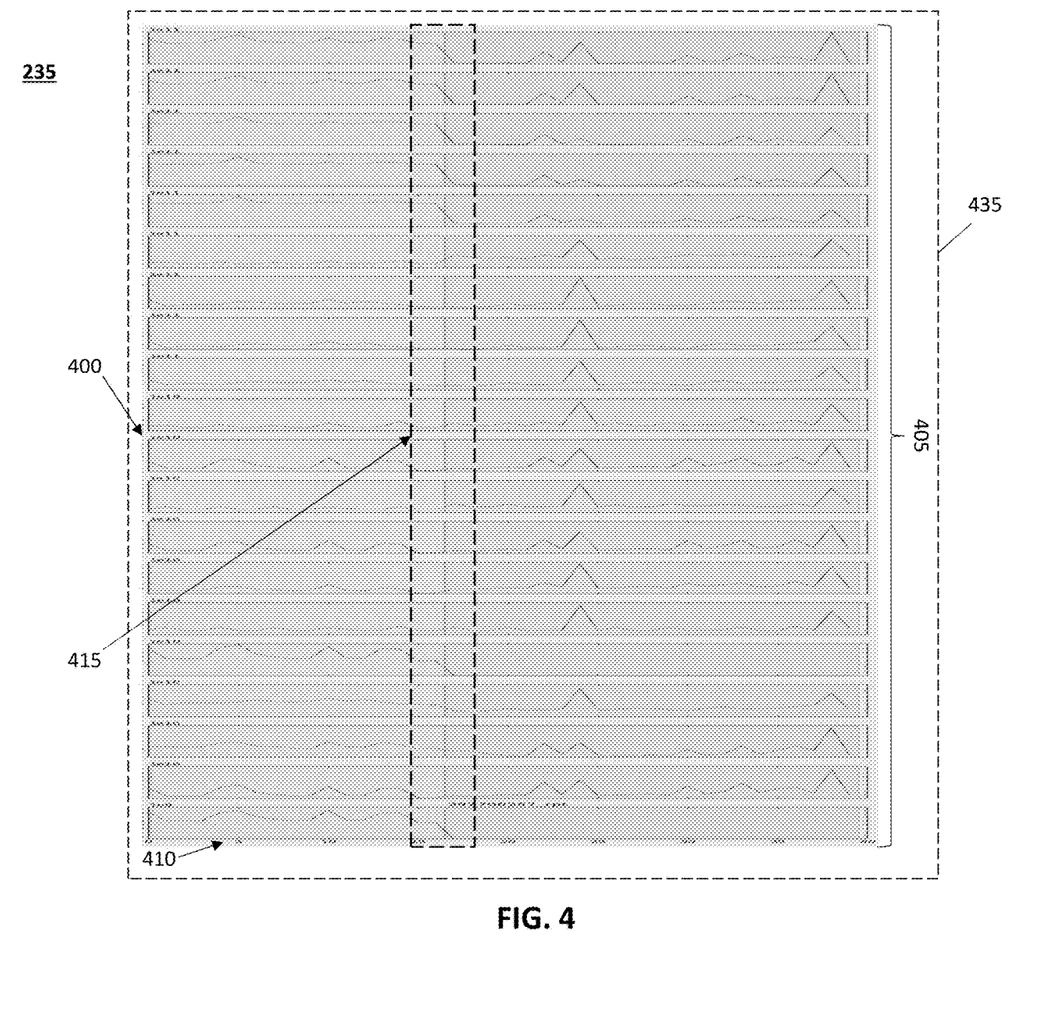
FIG. 4 is a heatmap signal graph in accordance with embodiments of the present disclosure.

Regarding FIG. 4, the threshold analyzer 235 can also include a thread error detector 435 that identifies each of the code path's relationship to one or more unresolved errors. For example, the thread error detector 435 can generate a change-rate graph 400 that identifies the heatmap code paths' traces 405 of their respective activity level change-rates 410. For example, the error detector 435 can compare differences between a set of previously and/or recently generated heatmaps (e.g., like the heatmap 300 of FIG. 3). For instance, the error detector 435 can include a detection processor (not shown) that uses a change point detection technique to calculate the activity level change rates. The change point detection technique can also identify each trace's deviant change points 415 with a statistically relevant nonconformity with historical change rates. For instance, the detection processor can provide the ML engine 290 with a statistically relevant number of change-rate graphs (e.g., graph 400) corresponding to a substantially similar time interval. The ML engine 290 can return one or more change-rate models that define each of the paths' traces' expected patterns. Thus, the error detector 435 can compare the traces 405 to one or more of the change-rate models' traces using the change point detection technique to identify the deviant change points 415. The threshold analyzer 235 can further perform one or more error mitigation techniques in response to identifying the deviant change points 415 as described herein.

The following text includes details of one or more methods and/or flow diagrams in accordance with this disclosure. For simplicity of explanation, the methods are depicted and described as a series of acts. However, acts in accordance with this disclosure can occur in various orders and/or concurrently with other acts not presented and described herein. Furthermore, not all illustrated acts may be required to implement the methods in accordance with the disclosed subject matter.

Figure 5:
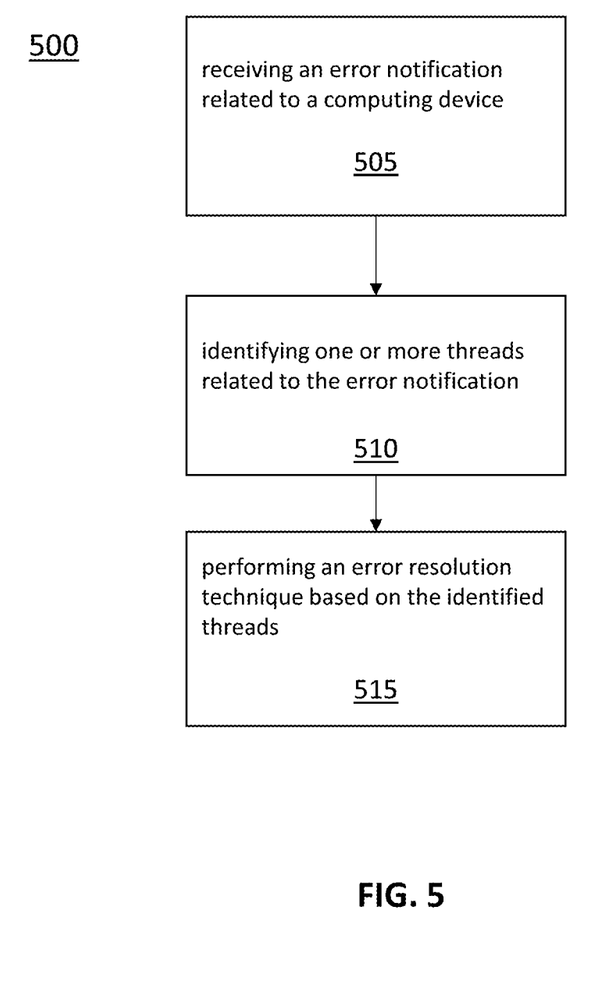
FIG. 5 is a flow diagram of a method for storage array error identification and resolution in accordance with embodiments of the present disclosure.

Regarding FIG. 5, a method 500 can be executed by, e.g., an array's EDS processor and/or any of the array's other components (e.g., the EDS processor 110 and/or components 101, respectively, of FIG. 1). The method 500 describes steps for identifying and resolving errors resulting from, e.g., an operating system update. At 505, the method 500 can include receiving an error notification related to a computing device. The method 500, at 510, can also include identifying one or more threads related to the error notification. At 515, the method 500 can further include performing an error resolution technique based on each identified thread. It should be noted that each step of the method 500 can include any combination of techniques implemented by the embodiments described herein.

Using the teachings disclosed herein, a skilled artisan can implement the above-described systems and methods in digital electronic circuitry, computer hardware, firmware, and/or software. The implementation can be as a computer program product. The implementation can, for example, be in a machine-readable storage device for execution by, or to control the operation of, data processing apparatus. The implementation can, for example, be a programmable processor, a computer, and/or multiple computers.

A computer program can be in any programming language, including compiled and/or interpreted languages. The computer program can have any deployed form, including a stand-alone program or as a subroutine, element, and/or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors and any one or more processors of any digital computer. Generally, a processor receives instructions and data from a read-only memory or a random-access memory or both. For example, a computer's essential elements are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

A computer having a display device that enables user interaction can implement the above-described techniques. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, and/or tactile input.

A distributed computing system that includes a back-end component can also implement the above-described techniques. The back-end component can, for example, be a data server, a middleware component, and/or an application server. Further, a distributing computing system that includes a front-end component can implement the above-described techniques. The front-end component can, for example, be a client computer having a graphical user interface, a Web browser through which a user can interact with an example implementation, and/or other graphical user interfaces for a transmitting device. The system's components can interconnect using any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), and/or other packet-based networks. Circuit-based networks can include, for example, a public switched telephone network (PSTN), a private branch exchange (PBX), a wireless network, and/or other circuit-based networks. Wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), and/or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, and/or plural forms of each are non-exhaustive lists. Thus, they are open-ended and contain any listed element and additional elements that are not listed. And/or is open-ended and includes one or more of the listed parts and combinations of the listed features.

One skilled in the art will realize that other specific forms can embody the concepts described herein without departing from their spirit or essential characteristics. Therefore, the preceding embodiments are, in all respects, illustrative rather than limiting the concepts described herein. Scope of the concepts is thus indicated by the appended claims rather than by the preceding description. Therefore, all changes embrace the meaning and range of equivalency of the claims.

What is claimed is:

1. A method comprising:
receiving an error notification related to a computing device;
identifying one or more threads related to the error notification;
performing an error resolution technique based on each identified thread;
inserting an event tracker in each thread's processing path; and
incrementing each event tracker in response to a processing initialization of each event tracker's related thread.

2. The method of claim 1, further comprising:
monitoring processing events of each thread.

3. The method of claim 2, further comprising:
capturing periodic snapshots of the one or more threads using each thread's event tracker.

4. The method of claim 3, further comprising:
using the snapshots, generating a heatmap of the one or more threads for each period.

5. The method of claim 4, further comprising:
identifying heatmap differences between at least one location on a current heatmap and at least one corresponding location on one or more previous heatmaps.

6. The method of claim 5, wherein each location on each heatmap relates to a subject thread of the one or more threads.

7. The method of claim 6, further comprising:
identifying each location on the current heatmap having a heatmap difference that exceeds a threshold.

8. The method of claim 7, further comprising:
selecting at least one of the threads related to each identified location; and
performing the error resolution technique based on the selected at least one thread.

9. An apparatus including a memory and a processor configured to:
receive an error notification related to a computing device;
identify one or more threads related to the error notification;
perform an error resolution technique based on each identified thread;
insert an event tracker in each thread's processing path; and
increment each event tracker in response to a processing initialization of each event tracker's related thread.

10. The apparatus of claim 9, further configured to monitor processing events of each thread.

11. The apparatus of claim 10, further configured to capture periodic snapshots of the one or more threads using each thread's event tracker.

12. The apparatus of claim 11, further configured to:
use the snapshots to generate a heatmap of the one or more threads for each period.

13. The apparatus of claim 12, further configured to identify heatmap differences between at least one location on a current heatmap and at least one corresponding location on one or more previous heatmaps.

14. The apparatus of claim 13, wherein each location on each heatmap relates to a subject thread of the one or more threads.

15. The apparatus of claim 14, further configured to identify each location on the current heatmap having a heatmap difference that exceeds a threshold.

16. The apparatus of claim 15, further configured to:
select at least one of the threads related to each identified location; and
perform the error resolution technique based on the selected at least one thread.

* * * * *